(12) United States Patent
Wang

(10) Patent No.: US 12,316,234 B2
(45) Date of Patent: May 27, 2025

(54) BI-DIRECTIONAL VOLTAGE CONVERTER FOR HIGH POWER APPLICATIONS

(71) Applicant: Chengdu Monolithic Power Systems Co., Ltd., Chengdu (CN)

(72) Inventor: Rui Wang, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 230 days.

(21) Appl. No.: 18/076,758

(22) Filed: Dec. 7, 2022

(65) Prior Publication Data
US 2023/0208305 A1 Jun. 29, 2023

(30) Foreign Application Priority Data
Dec. 29, 2021 (CN) .......................... 202111638237.9

(51) Int. Cl.
*H02M 3/335* (2006.01)
*H02M 1/08* (2006.01)

(52) U.S. Cl.
CPC ......... *H02M 3/33584* (2013.01); *H02M 1/08* (2013.01); *H02M 3/33573* (2021.05)

(58) Field of Classification Search
CPC ......... H02M 3/33584; H02M 3/33573; H02M 1/08; H02M 3/1582
See application file for complete search history.

(56) References Cited

U.S. PATENT DOCUMENTS

| 9,906,059 | B2 * | 2/2018 | Hang | H02J 7/0068 |
|---|---|---|---|---|
| 10,063,078 | B2 * | 8/2018 | Xu | H02J 7/00 |
| 10,116,155 | B2 * | 10/2018 | Xu | H02J 7/007 |
| 11,368,087 | B1 * | 6/2022 | Wang | H02M 1/0048 |
| 2017/0040898 | A1 * | 2/2017 | Hong | H02M 3/1582 |
| 2017/0187214 | A1 * | 6/2017 | Xu | H02J 7/00 |
| 2018/0287498 | A1 * | 10/2018 | Yu | H02M 3/1582 |
| 2022/0102996 | A1 * | 3/2022 | Sporck | H02M 3/1586 |
| 2022/0102999 | A1 * | 3/2022 | Sporck | H02J 7/0042 |

FOREIGN PATENT DOCUMENTS

CN 107465343 A * 12/2017

OTHER PUBLICATIONS

CN-107465343—Translation (Year: 2017).*

* cited by examiner

*Primary Examiner* — Thienvu V Tran
*Assistant Examiner* — Yahveh Comas Torres
(74) *Attorney, Agent, or Firm* — Perkins Coie LLP

(57) ABSTRACT

A bi-directional voltage converter having a first switch, a second switch, an inductor, a third switch, a fourth switch and a fifth switch connected in parallel with the third switch. The first switch is connected between an input terminal and a first switching terminal, the second switch is connected between the first switching terminal and a reference ground, the inductor is connected between the first switching terminal and an output switching terminal, the third switch is connected between the output switching terminal and a system terminal, the fourth switch is connected between the output switching terminal and the reference ground. When the bi-directional voltage converter is regulated to work in a buck charging mode or a boost discharging mode, the first and second switches are controlled to conduct on and off complementarily, the third and fifth switches are maintained at on state, the fourth switch is maintained at off state.

13 Claims, 6 Drawing Sheets

BI-DIRECTIONAL VOLTAGE CONVERTER FOR HIGH POWER APPLICATIONS

CROSS-REFERENCE TO RELATED APPLICATIONS

This application claims the benefit of CN application No. 202111638237.9 filed on Dec. 29, 2021 and incorporated herein by reference.

TECHNICAL FIELD

This disclosure generally relates to a bi-directional converter, and more particularly but not exclusively relates to a bi-directional converter for high power applications.

BACKGROUND OF THE INVENTION

A bi-directional voltage converter is widely used in a battery management system for providing a power supply to other circuits of the battery management system. Now with the increases of charging speed, more and more bi-directional voltage converters are required can be used in high power applications. In practical applications, a bi-directional voltage converter is original designed to have a chip size as small as possible for a low fabrication cost, so when the bi-directional voltage converter is used in a high power application, it may suffer an overheating problem and does not satisfy the application requirements because of its poor temperature characteristics. Therefore, for such bi-directional voltage converter, when it is used in high power applications, it is hoped to improve some electrical parameters for getting a better temperature performance. Now a new redesign bi-directional voltage converter having a big chip size is adopt to solve the overheating problem, which is not flexible.

Therefore, there is a need for a bi-directional voltage converter that can be used in low power applications and also in high power applications with a high efficiency.

SUMMARY OF THE INVENTION

In accomplishing the above and other objects, the present invention provides a bi-directional voltage converter coupled between an input terminal and a system terminal. The bi-directional voltage converter comprises a first switch coupled between the input terminal and a first switching terminal, a second switch coupled between the first switching terminal and a reference ground, a first inductor coupled between the first switching terminal and an output switching terminal, a third switch coupled between the output switching terminal and the system terminal, a fourth switch coupled between the output switching terminal and the reference ground and a fifth switch coupled in parallel with the third switch. The bi-directional voltage converter is regulated to work in a buck charging mode to convert an input voltage received at the input terminal to a buck charging voltage at the system terminal, or in a boost discharging mode to convert the system voltage at the system terminal to a boost discharging voltage at the input terminal, wherein when the bi-directional voltage converter is regulated to work in the buck charging mode or the boost discharging mode, in each switching cycle, the first switch and the second switch are controlled to conduct on and off switching complementarily, the third switch and the fifth switch are maintained at the on state, and the fourth switch is maintained at the off state, wherein the buck charging voltage is lower than the input voltage and the boost discharging voltage is higher than the system voltage.

BRIEF DESCRIPTION OF DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION OF THE INVENTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in an embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
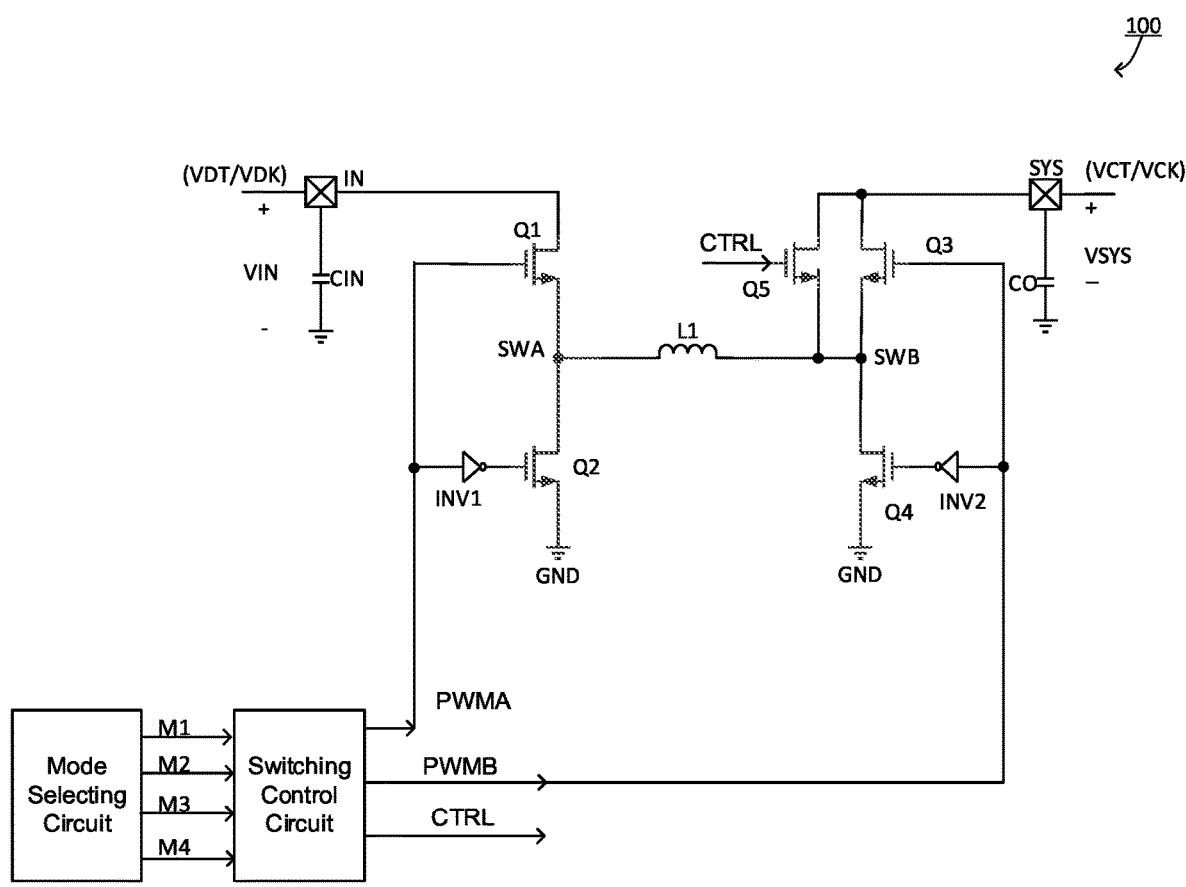
FIG. 1 illustrates a schematic circuit diagram of a bi-directional voltage converter 100 according to an embodiment of the present invention.

FIG. 1 illustrates a schematic circuit diagram of a bi-directional voltage converter 100 according to an embodiment of the present invention. The bi-directional voltage converter 100 is coupled between the input terminal IN and the system terminal SYS and can work either in a charging mode, i.e., converting an input voltage VIN received at the input terminal IN to a system voltage VSYS at the system terminal SYS, or in a discharging mode, i.e., converting the voltage at the system terminal SYS to the voltage at the input terminal IN. The bi-directional voltage converter 100 comprises a first switch Q1, a second switch Q2, a first inductor L1, a third switch Q3, a fourth switch Q4 and a fifth switch Q5, wherein the first switch Q1 is coupled between the input terminal IN and the first switching terminal SWA, the second switch Q2 is coupled between the first switching terminal SWA and a reference ground GND, the first inductor L1 is coupled between the first switching terminal SWA and an output switching terminal SWB, the third switch Q3 is coupled between the output switching terminal SWB and the system terminal SYS, the fourth switch Q4 is coupled between the output switching terminal SWB and the reference ground GND, and the fifth switch Q5 is coupled in parallel with the third switch Q3. In an embodiment, the first switch Q1, the second switch Q2, the third switch Q3, and the fourth switch Q4 are integrated on a semiconductor chip, while the fifth switch Q5 is external of the semiconductor chip. The bi-directional voltage converter 100 further comprises a mode selecting circuit and a switching control circuit, wherein the mode selecting circuit is configured to provide a boost charging enable signal M1, a buck charging enable signal M2, a boost discharging enable signal M3, and a buck discharging enable signal M4 to control the bi-directional voltage converter 100 to work in a boost charging mode, a buck charging mode, a boost discharging mode, or a buck discharging mode respectively. The boost charging enable signal M1, the buck charging enable signal M2, the boost discharging enable signal M3, and the buck discharging enable signal M4 are all logic signal, and each signal has a first state and a second state. When the boost charging enable signal M1 is in its first state, the bi-directional voltage converter 100 is configured to work in the boost charging mode, when the buck charging enable signal M2 is in its first state, the bi-directional voltage converter 100 is configured to work in the buck charging mode, when the boost discharging enable signal M3 is in its first state, the bi-directional voltage converter 100 is configured to work in the boost discharging mode, and when the buck discharging enable signal M4 is in its first state, the bi-directional voltage converter 100 is configured to work in the buck discharging mode. In another embodiment, the boost charging enable signal M1, the buck charging enable signal M2, the boost discharging enable signal M3, and the buck discharging enable signal M4 are generated by detecting and comparing the voltage at the input terminal IN and the voltage at the system terminal SYS. The switching control circuit is configured to generate a first control signal PWMA and a second control signal PWMB based on the received boost charging enable signal M1, buck charging enable signal M2, boost discharging enable signal M3 and buck discharging enable signal M4. Wherein the first switch Q1 and the second switch Q2 are controlled to conduct on and off switching by the first control signal PWMA, while the third switch Q3 and the fourth switch M4 are controlled to conduct on and off switching by the second control signal PWMB. A gate driving signal CTRL is also generated by the switching control circuit based on the received boost charging enable signal M1, buck charging enable signal M2, boost discharging enable signal M3 and buck discharging enable signal M4. And the fifth switch Q5 is controlled to conduct on and off switching by the gate driving signal CTRL. In FIG. 1, the bi-directional voltage converter 100 may comprise an input capacitor CIN coupled to the input terminal IN, and a load capacitor CO coupled to the system terminal SYS.

When the bi-directional voltage converter 100 is regulated to work in the boost charging mode, in each switching cycle, the first switch Q1 is maintained at the on state, the second switch Q2 is maintained at the off state, the third switch Q3 and the fourth switch Q4 are controlled to conduct on and off switching complementarily, and the fifth switch Q5 is maintained at the off state. Wherein the third switch Q3 and the fourth switch Q4 are controlled to conduct on and off switching complementarily means that, the fourth switch Q4 is at the off state when the third switch Q3 is at the on state, and the fourth switch Q4 is at the on state when the third switch Q3 is at the off state. When the bi-directional voltage converter 100 is regulated to work in the boost charging mode, the input voltage VIN received at the input terminal IN is converted to a boost charging voltage VCT at the system terminal SYS, wherein the boost charging voltage VCT is greater than the input voltage VIN. When the bi-directional voltage converter 100 is regulated to work in the buck charging mode, in each switching cycle, the first switch Q1 and the second switch Q2 are controlled to conduct on and off switching complementarily, the third switch Q3 and the fifth switch Q5 are maintained at the on state, and the fourth switch Q4 is maintained at the off state, and the input voltage VIN received at the input terminal IN is converted into a buck charging voltage VCK at the system terminal SYS. Wherein the first switch Q1 and the second switch Q2 are controlled to conduct on and off switching complementarily means that during a switching cycle, when the first switch Q1 is at the on state, the second switch Q2 is at the off state, and when the first switch Q1 is at the off state, the second switch Q2 is at the on state. When the bi-directional voltage converter 100 is regulated to work in the buck charging mode, the bi-directional voltage converter 100 has a buck duty cycle DBK, which is defined as a ratio of the first switch Q1 at the on state time to the time of one switching cycle, the buck duty cycle DBK is determined by the input voltage VIN and the buck charging voltage VCK. In one embodiment, when the input voltage VIN is maintained at a certain value, the buck duty cycle DBK is increased with the increase of the buck charging voltage VCK. In another embodiment, when the buck charging voltage VCK is maintained at a certain value, the buck duty cycle DBK is decreased with the increase of the input voltage VIN.

When the bi-directional voltage converter 100 is regulated to work in the boost discharging mode, in each switching cycle, the first switch Q1 and the second switch Q2 are controlled to conduct on and off switching complementarily, the third switch Q3 and the fifth switch Q5 are maintained at the on state, and the fourth switch Q4 are maintained at the off state, and the system voltage VSYS at the system terminal SYS is converted to a boost discharging voltage VDT at the input terminal IN. When the bi-directional voltage converter 100 is configured to work in the boost discharging mode, the bi-directional voltage converter 100 has a boost duty cycle DBT, which is defined as a ratio of the first switch Q1 at the on state time to the time of one switching cycle is referred as a boost duty cycle DBT, and the boost duty cycle DBT is determined by the system voltage VSYS and the boost discharging voltage VDT. In an embodiment, when the system voltage VSYS is set at a certain value, the boost duty cycle DBT is increased with the increase of the boost discharging voltage VDT. In another embodiment, when the boost discharging voltage VDT is set at a certain value, the boost duty cycle DBT is decreased with the increase of the system voltage VSYS. When the bi-directional voltage converter 100 is regulated to work in the buck discharging mode, in each switching cycle, the first switch Q1 is maintained at the on state, the second switch Q2 is maintained at the off state, the third switch Q3 and the fourth switch Q4 are controlled to conduct on and off switching complementarily, the fifth switch Q5 is maintained at the off state, the system voltage VSYS at the system terminal SYS is converted to a buck discharging voltage VDK at the input terminal IN, wherein the buck discharging voltage VDK is smaller than the system voltage VSYS.

Figure 2:
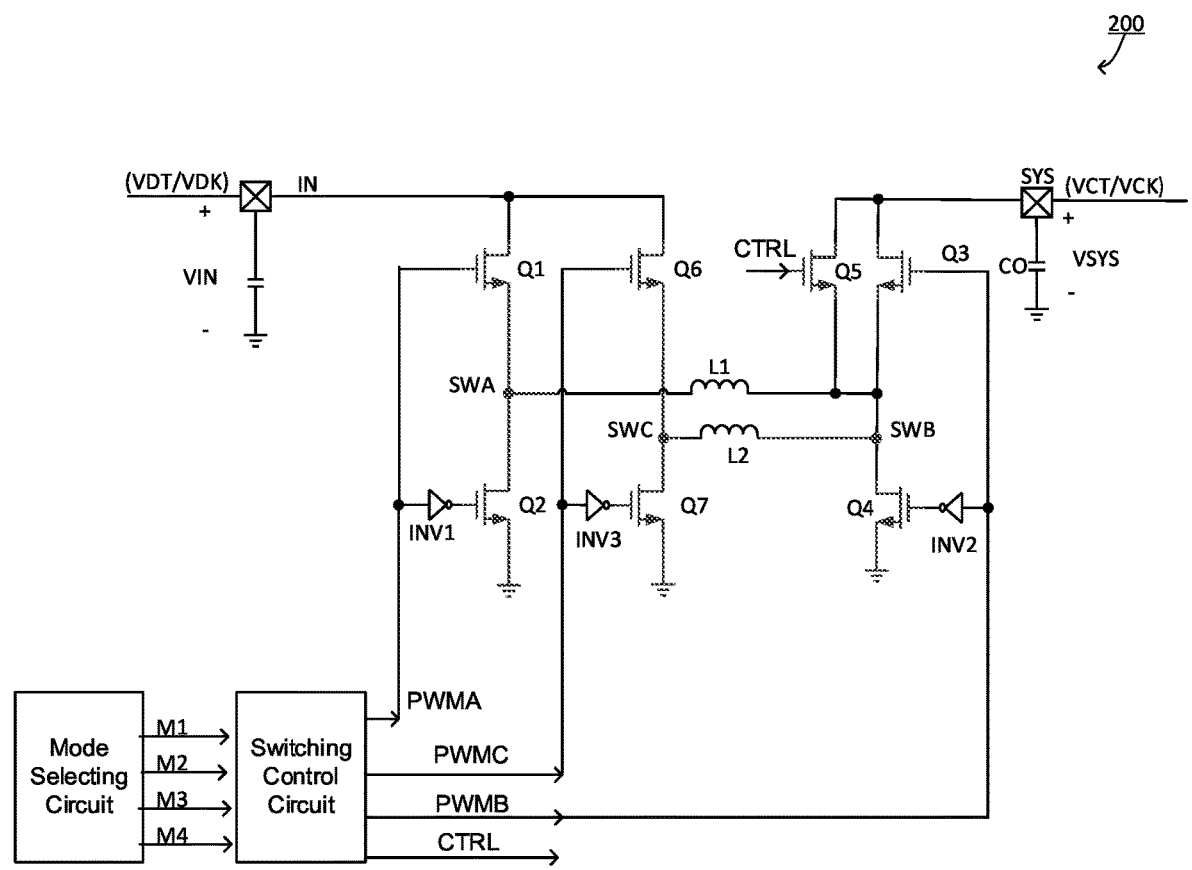
FIG. 2 illustrates a schematic circuit diagram of a bi-directional voltage converter 200 according to another embodiment of the present invention.

FIG. 2 illustrates a schematic circuit diagram of a bi-directional voltage converter 200 according to another embodiment of the present invention. Compared to the bi-directional voltage converter 100, the bi-directional voltage converter 200 further comprises a second inductor L2, a sixth switch Q6, and a seventh switch Q7, wherein the sixth switch Q6 is coupled between the input terminal IN and a second switching terminal SWC, the seventh switch Q7 is coupled between the second switching terminal SWC and the reference ground GND, and the second inductor L2 is coupled between the second switching terminal SWC and the reference ground GND. Compared to the bi-directional voltage converter 100, the switching control circuit in FIG. 2 is configured to generate a third control signal PWMC based on the received boost charging enable signal M1, buck charging enable signal M2, boost discharging enable signal M3 and buck discharging enable signal M4. Wherein the first switch Q1 and the second switch Q2 are controlled to conduct on and off switching by the first control signal PWMA, while the third switch Q3 and the fourth switch M4 are controlled to conduct on and off switching by the second control signal PWMB. The sixth switch Q6 and the seventh switch Q7 are controlled to conduct on and off switching by the third control signal PWMC. The first control signal PWMA, the second control signal PWMA, the third control signal PWMC and the gate driving signal CTRL are all logic signal, and each signal has a logic high state and a logic low state. The bi-directional voltage converter circuit 200 may also be regulated to work in the boost charging mode, the buck charging mode, the boost discharging mode or the buck discharging mode by the boost charging enable signal M1, the buck charging enable signal M2, the boost discharging enable signal M3 and the buck discharging enable signal M4. When the bi-directional voltage converter 200 is regulated to work in the boost charging mode, in each switching cycle, the first switch Q1 is maintained at the on state, the second switch Q2 is maintained at the off state, the third switch Q3 and the fourth switch Q4 are controlled to conduct on and off switching complementarily, the fifth switch Q5 is maintained at the off state, the sixth switch Q6 is maintained at the on state, and the seventh switch Q7 is maintained at the off state. When the bi-directional voltage converter 200 is regulated to work in the buck charging mode, in each switching cycle, the first switch Q1 and the second switch Q2 are controlled to conduct on and off switching complementarily, the third switch Q3 and the fifth switch Q5 are maintained at the on state, the fourth switch Q4 are maintained at the off state, and the sixth switch Q6 and the seventh switch Q7 are controlled to conduct on and off switching complementarily. Wherein the sixth switch Q6 and the seventh switch Q7 are controlled to conduct on and off switching complementarily means that during a switching cycle, when the sixth switch Q6 is at the on state, the seventh switch Q7 is at the off state, and when the sixth switch Q6 is at the off state, the seventh switch Q7 is at the on state. In one embodiment, the first switch Q1 and the sixth switch Q6 are controlled to conduct on and off simultaneously, i.e., the first switch Q1 and the sixth switch Q6 are controlled to be turned on and turned off at the same moment. When the bi-directional voltage converter 200 is regulated to work in the boost discharging mode, in each switching cycle, the first switch Q1 and the second switch Q2 are controlled to conduct on and off switching complementarily on and off, the third switch Q3 and the fifth switch Q5 is maintained at the on state, the fourth switch Q4 is maintained at the off state, and the sixth switch Q6 and the seventh switch Q7 are controlled to conduct on and off switching complementarily. In one embodiment, in each switching cycle, the first switch Q1 and the sixth switch Q6 are controlled to conduct on and off switching simultaneously, i.e., the first switch Q1 and the sixth switch Q6 are controlled to be turned on and turned off at the same moment. When the bi-directional voltage converter 200 is regulated to work in the buck discharging mode, in each switching cycle, the first switch Q1 and the sixth switch Q6 are maintained at the on state, the second switch Q2 and the seventh switch Q7 are maintained at the off state, the third switch Q3 and the fourth switch Q4 are controlled to conduct on and off switching complementarily, and the fifth switch Q5 are controlled to maintain at the off state by the gate driving signal CTRL.

Figure 3:
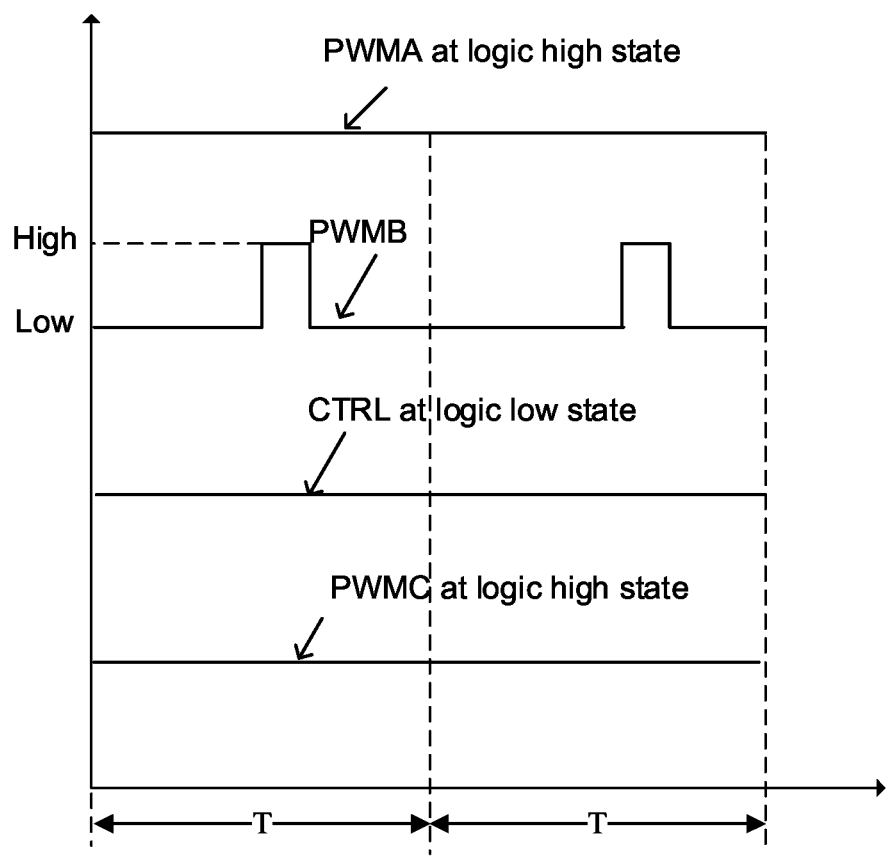
FIG. 3 illustrates a waveform diagram of each control signal when the bi-directional voltage converter 200 is regulated to work in the boost charging mode according to an embodiment of the present invention.

FIG. 3 illustrates a waveform diagram of each control signal when the bi-directional voltage converter 200 is regulated to work in the boost charging mode according to an embodiment of the present invention. The first control signal PWMA, the second control signal PWMB, the gate driving signal CTRL, and the third control signal PWMC are all shown in FIG. 3. In each switching cycle T, for the first control signal PWMA, it is maintained at the logic high state to control the first switch Q1 to be maintained at the on state and the second switch Q2 to be maintained at the off state. For the second control signal PWMB, when it is at the logic high state, the third switch Q3 is turned on and the fourth switch Q4 is turned off, when it is at the logic low state, the third switch Q3 is turned off and the fourth switch Q4 is turned on. For the gate driving signal CTRL, it is maintained at the logic high state to control the fifth switch Q5 to be maintained at the on state. For the third control signal PWMC, it is maintained at the logic high state to control the sixth switch Q6 to be maintained at the on state and the seventh switch Q7 to be maintained at the off state.

Figure 4:
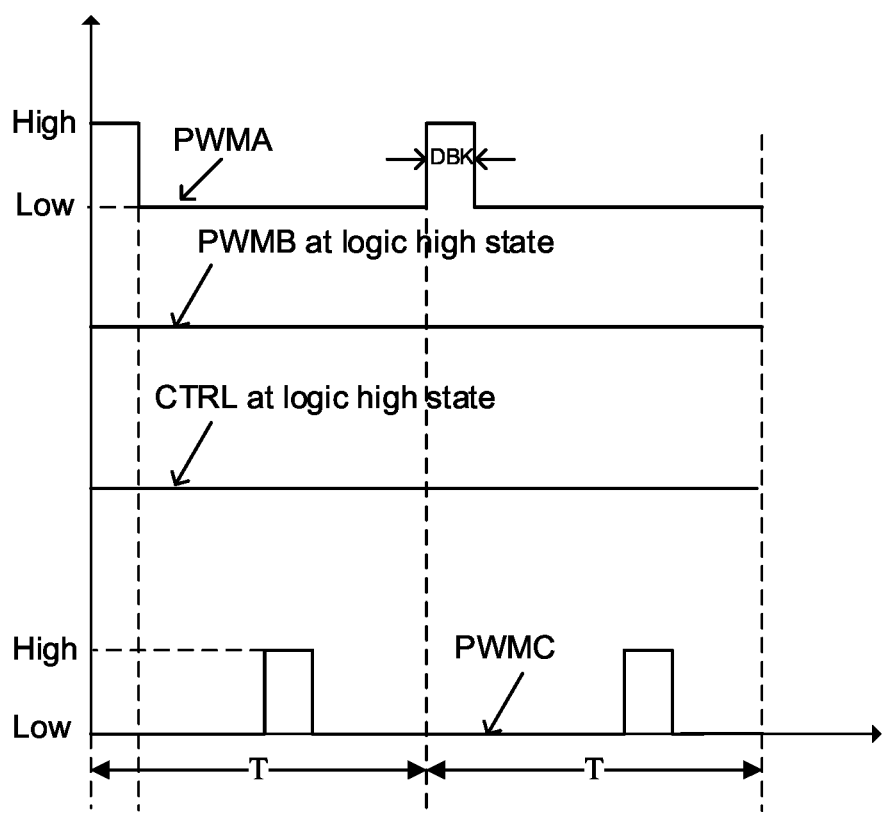
FIG. 4 illustrates a waveform diagram of each control signal when the bi-directional voltage converter 200 is regulated to work in the buck charging mode according to an embodiment of the present invention.

FIG. 4 illustrates a waveform diagram of each control signal when the bi-directional voltage converter 200 is regulated to work in the buck charging mode according to an embodiment of the present invention. The first control signal PWMA, the second control signal PWMB, the gate driving signal CTRL, and the third control signal PWMC are all shown in FIG. 4. In each switching cycle T, for the first control signal PWMA, when it is at the logic high state, the first switch Q1 is turned on and the second switch Q2 is turned off, when it is at the logic low state, the first switch Q1 is turned off and the second switch Q2 is turned on. For the second control signal PWMB, it is maintained at the logic high state to control the third switch Q3 to be maintained at the on state and the fourth switch Q4 to be maintained at the off state. For the gate driving signal CTRL, it is maintained at the logic high state to control the fifth switch Q5 to be maintained at the on state. For the third control signal PWMC, when it is at the logic high state, the sixth switch Q6 is turned on and the seventh switch Q7 is turned off, and when it is at the logic low state, the sixth switch Q6 is turned off and the seventh switch Q7 is turned on. In the embodiment shown in FIG. 4, the third control signal PWMC and the first control signal PWMA have a phase difference of 180°. In other embodiments, the third control signal PWMC and the first control signal PWMA may have a phase difference equal to zero, i.e., the first switch Q1 and the sixth switch Q6 are controlled to be turned on at the same moment. In FIG. 4, the buck duty cycle DBK, i.e., the ratio of the first control signal PWMA at the logic high state time to the time of one switching period T is also marked.

Figure 5:
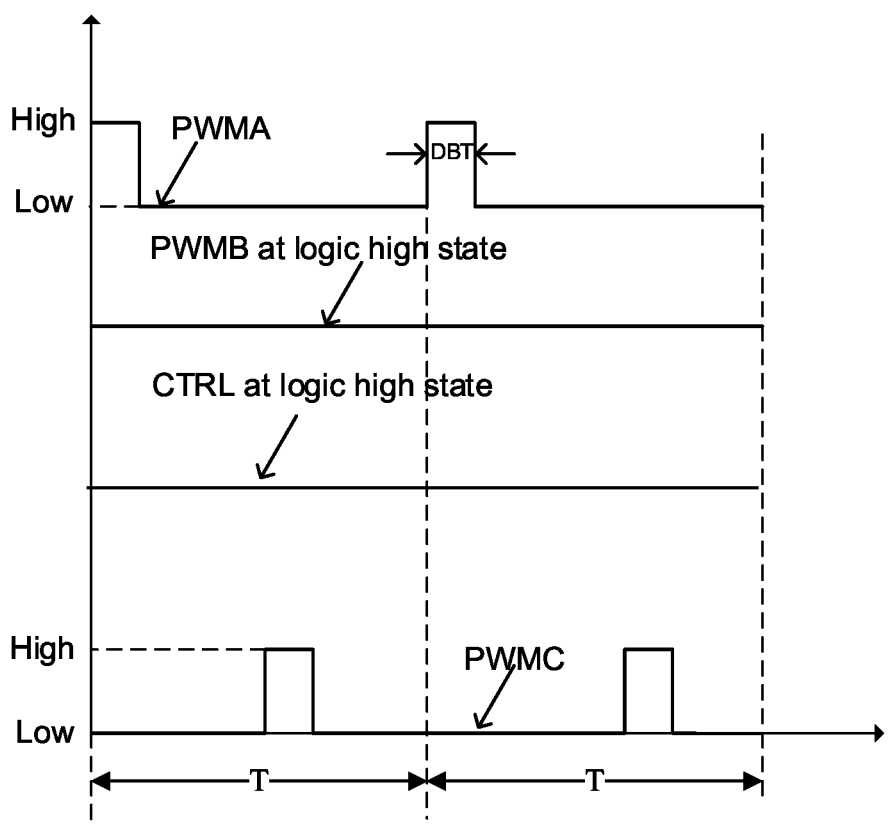
FIG. 5 illustrates a waveform diagram of each control signal when the bi-directional voltage converter 200 is regulated to work in boost discharging mode according to an embodiment of the present invention.

FIG. 5 illustrates a waveform diagram of each control signal when the bi-directional voltage converter 200 is regulated to work in boost discharging mode according to an embodiment of the present invention. The first control signal PWMA, the second control signal PWMB, the gate driving signal CTRL, and the third control signal PWMC are all shown in FIG. 5. In each switching cycle T, for the first control signal PWMA, when it is at the logic low state, the first switch Q1 is turned off and the second switch Q2 is turned on, and when it is at the logic high state, the first switch Q1 is turned on and the second switch Q2 is turned off. For the second control signal PWMB, it is maintained at the logic high state to control the third switch Q3 to be maintained at the on state and the fourth switch Q4 to be maintained at the off state. For the gate driving signal CTRL, it is maintained at the logic high state to control the fifth switch Q5 to be maintained at the on state. For the third control signal PWMC, when it is at the logic high state, the sixth switch Q6 is turned on and the seventh switch Q7 is turned off, and when the third control signal PWMC is at the logic low state, the sixth switch Q6 is turned off and the seventh switch Q7 is turned on. In the embodiment shown in FIG. 5, the third control signal PWMC and the first control signal PWMA have a phase difference between of 180°. In other embodiments, the third control signal PWMC and the first control signal PWMA may have a phase difference equal to zero, i.e., the first switch Q1 and the sixth switch Q6 are turned on at the same moment. In FIG. 5, the boost duty cycle DBT, i.e., the ratio of the first control signal PWMA at the logic high state time to the time of one switching period T is also marked.

Figure 6:
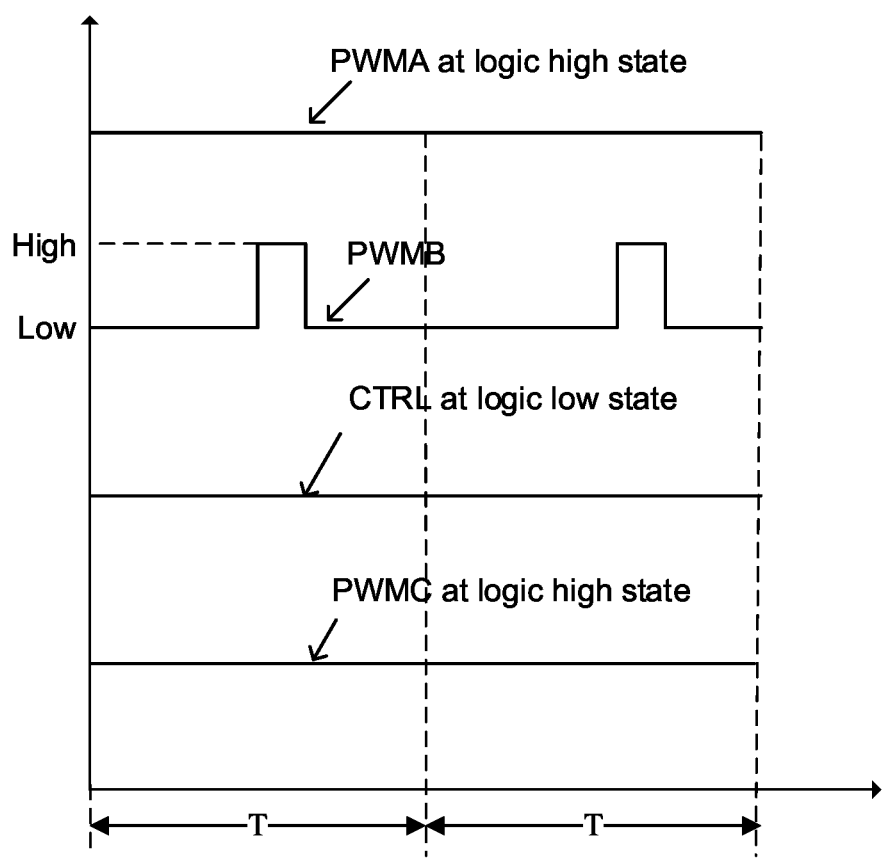
FIG. 6 illustrates a waveform diagram of each control signal when the bi-directional voltage converter 200 is regulated to work in the buck discharging mode according to an embodiment of the present invention.

FIG. 6 illustrates a waveform diagram of each control signal when the bi-directional voltage converter 200 is regulated to work in the buck discharging mode according to an embodiment of the present invention. The first control signal PWMA, the second control signal PWMB, the gate driving signal CTRL, and the third control signal PWMC are all shown in FIG. 6. In each switching cycle, for the first control signal PWMA, it is maintained at the logic high state to control the first switch Q1 to be maintained at the on state, and the second switch Q2 to be maintained at the low sate. For the second control signal PWMB, when it is at the logic high state, the third switch Q3 is turned on and the fourth switch Q4 is turned off, and when the second control signal PWMB is at the logic low state, the third switch Q3 is turned off and the fourth switch Q4 is turned on. For the gate driving signal CTRL, it is maintained at the logic low state to control the fifth switch Q5 to be maintained at the off state. For the third control signal PWMC, it is maintained at the logic high state to control the sixth switch Q6 to be maintained at the on state and the seventh switch Q7 to be maintained at the off state.

With the bi-directional voltage converter of the present invention, the fifth switch Q5 is controlled to be maintained at the on state when the bi-directional voltage converter is regulated to work in the buck charging mode or boost discharging mode, which made the bi-directional voltage converter to have an improved efficiency and a better temperature characteristic.

The advantages of the various embodiments of the present invention are not confined to those described above. These and other advantages of the various embodiments of the present invention will become more apparent upon reading the whole detailed descriptions and studying the various FIGS. of the drawings.

From the foregoing, it will be appreciated that specific embodiments of the present invention have been described herein for purposes of illustration, but that various modifications may be made without deviating from the technology. Many of the elements of an embodiment may be combined with other embodiments in addition to or in lieu of the elements of the other embodiments. Accordingly, the present invention is not limited except as by the appended claims.

What is claimed is:

1. A bi-directional voltage converter coupled between an input terminal and a system terminal, the bi-directional voltage converter comprising:
   a first switch, coupled between the input terminal and a first switching terminal;
   a second switch, coupled between the first switching terminal and a reference ground;
   a first inductor, coupled between the first switching terminal and an output switching terminal;
   a third switch, coupled between the output switching terminal and the system terminal;
   a fourth switch, coupled between the output switching terminal and the reference ground;
   a fifth switch, coupled in parallel with the third switch;
   a second inductor, coupled between a second switching terminal and the output switching terminal;
   a sixth switch, coupled between the input terminal and the second switching terminal; and
   a seventh switch, coupled between the second switching terminal and the reference ground,
   wherein the bi-directional voltage converter is regulated to work in a buck charging mode to convert an input voltage received at the input terminal to a buck charging voltage at the system terminal, or in a boost discharging mode to convert a system voltage at the system terminal to a boost discharging voltage at the input terminal, wherein when the bi-directional voltage converter is regulated to work in the buck charging mode or the boost discharging mode, in each switching cycle, the first switch and the second switch are controlled to conduct on and off switching complementarily, the third switch and the fifth switch are maintained at an on state, and the fourth switch is maintained at an off state, the sixth switch and the seventh switch are controlled to conduct on and off switching complementarily in each switching cycle, and the first switch and the sixth switch are controlled to be turned on and turned off simultaneously, wherein the buck charging voltage is lower than the input voltage and the boost discharging voltage is higher than the system voltage.

2. The bi-directional voltage converter of claim 1, wherein when the bi-directional voltage converter is regulated to work in the buck charging mode, a buck duty cycle is determined by the input voltage and the buck charging voltage, and when the bi-directional voltage converter is regulated to work in the boost discharging mode, a boost duty cycle is determined by the system voltage and the boost discharging voltage.

3. The bi-directional voltage converter of claim 1, wherein when the bi-directional voltage converter is regulated to work in a boost charging mode to convert the input voltage received at the input terminal to a boost charging voltage at the system terminal, in each switching cycle, the first switch is maintained at the on state, the second switch is maintained at the off state, the third switch and the fourth switch are controlled to conduct on and off switching complementarily, and the fifth switch is maintained at the off state, wherein the boost charging voltage is greater than the input voltage.

4. The bi-directional voltage converter of claim 1, wherein when the bi-directional voltage converter is regulated to work in a buck discharging mode to convert the system voltage at the system terminal to a buck discharging voltage at the input terminal, in each switching cycle, the first switch is maintained at the on state, the second switch is maintained at the off state, the third switch and the fourth switch are controlled to conduct on and off switching complementarily, and the fifth switch is maintained at the off state, wherein the system voltage is greater than the buck discharging voltage.

5. The bi-directional voltage converter of claim 1, wherein when the bi-directional voltage converter is regulated to work in the boost charging mode, the sixth switch is maintained at the on state and the seventh switch is maintained at the off state in each switching cycle.

6. The bi-directional voltage converter of claim 1, wherein when the bi-directional voltage converter is regulated to work in the buck discharging mode, the sixth switch is maintained at the on state and the seventh switch is maintained at the off state in each switching cycle.

7. A bi-directional voltage converter coupled between an input terminal and a system terminal, the bi-directional voltage converter comprising:
- a first switch, coupled between the input terminal and a first switching terminal;
- a second switch, coupled between the first switching terminal and a reference ground;
- a first inductor, coupled between the first switching terminal and an output switching terminal;
- a third switch, coupled between the output switching terminal and the system terminal;
- a fourth switch, coupled between the output switching terminal and the reference ground;
- a fifth switch, coupled in parallel with the third switch;
- a second inductor, coupled between a second switching terminal and the output switching terminal;
- a sixth switch, coupled between the input terminal and the second switching terminal;
- a seventh switch, coupled between the second switching terminal and the reference ground, and
- a mode selecting circuit, configured to provide a boost charging enable signal, a buck charging enable signal, a boost discharging enable signal and a buck discharging enable signal for controlling the bi-directional converter to work in a boost charging mode, a buck charging mode, a boost discharging mode or a buck discharging mode respectively; and
- a switching control circuit, configured to generate a first control signal, a second control signal, and a gate driving signal based on the boost charging enable signal, the buck charging enable signal, the boost discharging enable signal and the buck discharging enable signal;

wherein the first switch and the second switch are controlled by the first control signal, the third switch and the fourth switch are controlled by the second control signal, and the fifth switch is controlled be turned on or turned off by the gate driving signal, wherein when the bi-directional voltage converter is regulated to work in the buck charging mode or the boost discharging mode, in each switching cycle, the sixth switch and the seventh switch are controlled to conduct on and off switching complementarily, and the first switch and the sixth switch are controlled to be turned on or turned off simultaneously.

8. The bi-directional voltage converter of claim 7, wherein when the bi-directional voltage converter is regulated to work in the buck charging mode to convert an input voltage received at the input terminal to a buck charging voltage at the system terminal, in each switching cycle, the first switch and the second switch are controlled to conduct on and off switching complementarily, the third switch and the fifth switch are maintained at the on state, and the fourth switch is maintained at the off state, and wherein the buck charging voltage is lower than the input voltage.

9. The bi-directional voltage converter of claim 7, wherein when the bi-directional voltage converter is regulated to work in the boost discharging mode to convert a system voltage at the system terminal to a boost discharging voltage at the input terminal, in each switching cycle, the first switch and the second switch are controlled to conduct on and off switching complementarily, the third switch and the fifth switch are maintained at the on state, and the fourth switch is maintained at the off state, and wherein the boost discharging voltage is higher than the system voltage.

10. The bi-directional voltage converter of claim 7, wherein when the bi-directional voltage converter is regulated to work in a boost charging mode to convert an input voltage received at the input terminal to a boost charging voltage at the system terminal, in each switching cycle, the first switch is maintained at the on state, the second switch is maintained at the off state, the third switch and the fourth switch are controlled to conduct on and off switching complementarily, and the fifth switch is maintained at the off state, and wherein the boost charging voltage is greater than the input voltage.

11. The bi-directional voltage converter of claim 7, wherein when the bi-directional voltage converter is regulated to work in a buck discharging mode to convert an system voltage at the system terminal to a buck discharging voltage at the input terminal, in each switching cycle, the first switch is maintained at the on state, the second switch is maintained at the off state, the third switch and the fourth switch are controlled to conduct on and off switching complementarily, and the fifth switch is maintained at the off state, and wherein the system voltage is greater than the buck discharging voltage.

12. The bi-directional voltage converter of claim 7, wherein when the bi-directional voltage converter is regulated to work in the boost charging mode, the sixth switch is maintained at the on state and the seventh switch is maintained at the off state in each switching cycle.

13. The bi-directional voltage converter of claim 7, wherein when the bi-directional voltage converter is regulated to work in the buck discharging mode, the sixth switch is maintained at the on state and the seventh switch is maintained at the off state in each switching cycle.

* * * * *